US012587131B2

(12) United States Patent
Kresse et al.

(10) Patent No.: US 12,587,131 B2
(45) Date of Patent: Mar. 24, 2026

(54) HIGH EFFICIENCY GEAR BOX AND HOLDING SYSTEM FOR SOLAR TRACKERS

(71) Applicant: Nextpower LLC, Fremont, CA (US)

(72) Inventors: David Kresse, Walnut Creek, CA (US); Yang Liu, Mountain View, CA (US); Alexander W. Au, Oakland, CA (US)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/652,058

(22) Filed: May 1, 2024

(65) Prior Publication Data

US 2024/0372505 A1 Nov. 7, 2024

Related U.S. Application Data

(60) Provisional application No. 63/464,381, filed on May 5, 2023.

(51) Int. Cl.
*H02S 20/32* (2014.01)
(52) U.S. Cl.
CPC .................................... *H02S 20/32* (2014.12)
(58) Field of Classification Search
CPC ....................................................... H02S 20/32
See application file for complete search history.

(56) References Cited

U.S. PATENT DOCUMENTS

| | | | |
|---|---|---|---|
| 2008/0308091 A1 | 12/2008 | Corio | |
| 2015/0207005 A1 | 7/2015 | Feng | |
| 2018/0329375 A1 | 11/2018 | Gharabegian | |
| 2021/0175841 A1 | 6/2021 | Betts et al. | |

OTHER PUBLICATIONS

International Searching Authority "International Search Report and Written Opinion" From Application No. PCT/US2024/027165, Mailed Aug. 6, 2024, pp. 14.

*Primary Examiner* — Golam Mowla
(74) *Attorney, Agent, or Firm* — Fredrikson & Byron, P.A.

(57) ABSTRACT

A solar tracker includes a plurality of piers, one end of the piers configured for installation in the earth, a plurality of bearings, each bearing supported by a pier, a torque tube received in the plurality of bearings and configured to support a plurality of solar modules, a plurality of drive motors, each drive motor associated with a pier, a plurality of high efficiency gear boxes, each high efficiency gear box associated with one of the plurality of drive motors; and a plurality of brakes, each brake associated with one of the plurality of high efficiency gear boxes and one of the plurality of drive motors, wherein in combination the plurality of brakes apply sufficient braking force to prevent back driving of the torque tube.

20 Claims, 11 Drawing Sheets

HIGH EFFICIENCY GEAR BOX AND HOLDING SYSTEM FOR SOLAR TRACKERS

RELATED APPLICATIONS

This application claims the benefit of U.S. Provisional Patent Application No. 63/464,381, filed May 5, 2023, the entire contents of which are incorporated herein by reference.

TECHNICAL FIELD

The present disclosure relates to solar power generation systems, and more particularly, to solar tracker actuating systems for adjusting the orientation of the solar power generation components to track the location of the sun.

BACKGROUND

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. The present disclosure seeks to address the shortcomings of prior tracker systems.

SUMMARY

One aspect of the disclosure is directed to a solar tracker including a plurality of piers, one end of the piers configured for installation in the earth; a plurality of bearings, each bearing supported by a pier. The tracker also includes a torque tube received in the plurality of bearings and configured to support a plurality of solar modules; a plurality of drive motors, each drive motor associated with a pier; a plurality of high efficiency gear boxes, each high efficiency gear box associated with one of the plurality of drive motors; and a plurality of brakes, each brake associated with one of the plurality of high efficiency gear boxes and one of the plurality of drive motors, where in combination the plurality of brakes apply sufficient braking force to prevent back driving of the torque tube. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The solar tracker where the plurality of brakes are mechanical brakes. The plurality of brakes is achieved by shorting windings of the motor. A resistance across the windings is adjusted to control a braking force. The solar tracker further including a plurality of linear actuators. The linear actuators include a screw in mechanical communication with the high efficiency gear box, a nut configured to receive the screw and a sleeve, where the screw is driven into and out of the nut to rotate the torque tube and the solar modules. Each distributed motor controller is embodied in or located proximate an individual one of the plurality of drive motors. The solar tracker further including a master controller in communication with the distributed motor controllers. The master controller and the distributed motor controllers are in communication to apply or terminate application of energy to the plurality of motors and plurality of brakes in a coordinated manner. The solar tracker further including a plurality of sensors, the plurality of sensors providing feedback data to the distributed motor controllers and the master controller regarding energy usage of the plurality of motors and plurality of brakes or position of the solar tracker. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A further aspect of the disclosure is directed to a solar tracker including a plurality of piers, one end of the piers configured for installation in the earth; a plurality of bearings, each bearing supported by a pier. The tracker also includes a torque tube received in the plurality of bearings and configured to support a plurality of solar modules; at least one drive motor associated with a pier; a high efficiency gear box associated with one of the at least one drive motor; and a motor controller, the motor controller including a memory storing therein instructions which when executed by a processor cause the motor controller to perform steps of: receive wind speed and wind direction data from a sensor; determine that the wind speed exceeds a threshold; determine an orientation of the solar tracker; determine a direction for rotation of the solar tracker to a nearest appropriate stow position; and allow the solar tracker to back drive to the appropriate stow position, or drive the solar tracker into the wind to the appropriate stow position. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The solar tracker where the instructions stored on the memory and executed by the processor cause the motor controller to perform a step of: determine whether the wind direction loads the solar tracker. The instructions stored on the memory and executed by the processor cause the motor controller to perform a step of: determine a position of the solar tracker in a solar power plant. The nearest appropriate stow position is determined based on the wind speed, wind direction, and location of the solar tracker in the solar power plant. The nearest appropriate stow positions requires the back driving of the solar tracker into the direction of the wind. The instructions stored on the memory and executed by the processor cause the motor controller to perform a step of: determine that the wind speed does not exceed a threshold; and determine whether the solar tracker is in a stow position. The instructions stored on the memory and executed by the processor cause the motor controller to perform a step of: determine whether diffuse light conditions are detected, where if no diffuse light conditions are detected the motor controller drives the solar tracker to a sun tracking position. The instructions stored on the memory and executed by the processor cause the motor controller to perform a step of: determine whether diffuse light conditions are detected, where if diffuse light conditions are detected the motor controller drives the solar tracker to a diffuse light position. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Still a further aspect of the disclosure is directed to a high efficiency gear box and drive assembly for a solar tracker. The high efficiency gear box includes an electric motor. The box also includes a gear box mechanically coupled to the electric motor, where the gear box is configured to permit back driving of the solar tracker; a motor controller in electrical communication with the electric motor, where the motor controller includes a memory storing therein instructions when executed by a processor cause the motor controller to perform steps of: receive wind speed and wind direction data from a sensor; determine that the wind speed exceeds a threshold; determine an orientation of the solar tracker; determine a direction for rotation of the solar tracker to a nearest appropriate stow position; and allow the motor and gear box to back drive the solar tracker to the appropriate stow position. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The high efficiency gear box and drive assembly further including a mechanical brake. To back drive of the solar tracker, the motor controller reduces a current or voltage applied to the motor such that loading of the solar tracker caused by the wind overcomes the motor and the back drive is controlled by the electric motor. The determination of a direction of rotation is based on the wind speed, wind direction, orientation of the solar tracker, and position of the solar tracker within a solar power plant. The instructions when executed by a processor cause the motor controller to perform steps of returning the solar tracker to a sun tracking position upon determining that the wind speed is below a threshold. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Yet another aspect of the disclosure is directed to a solar tracker including a plurality of piers, one end of the piers configured for installation in the earth; a plurality of bearings, each bearing supported by a pier. The tracker also includes a torque tube received in the plurality of bearings and configured to support a plurality of solar modules; a plurality of drive motors, each drive motor associated with a pier; a plurality of high efficiency gear boxes, each high efficiency gear box associated with one of the plurality of drive motors; and a plurality of brakes, each brake associated with one of the plurality of high efficiency gear boxes and one of the plurality of drive motors, where in combination the plurality of brakes apply sufficient braking force to limit back driving of the torque tube, where upon failure of one of the plurality of drive motors, remaining drive motors of the plurality of drive motors are capable of driving or back driving the solar tracker. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The solar tracker where the plurality of brakes are mechanical brakes. The plurality of brakes is achieved by shorting windings of the motor. A resistance across the windings is adjusted to control a braking force. The plurality of high efficiency gear box includes one or more planetary, helical, spur gears, bevel gears, face gears, spiral bevel gears. The plurality of high efficiency gear boxes has an efficiency of approximately 90%. The plurality of high efficiency gear boxes includes two sets of planetary gears. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

Various aspects and features of the present disclosure are described hereinbelow with reference to the drawings, wherein.

DETAILED DESCRIPTION

Figure 1:
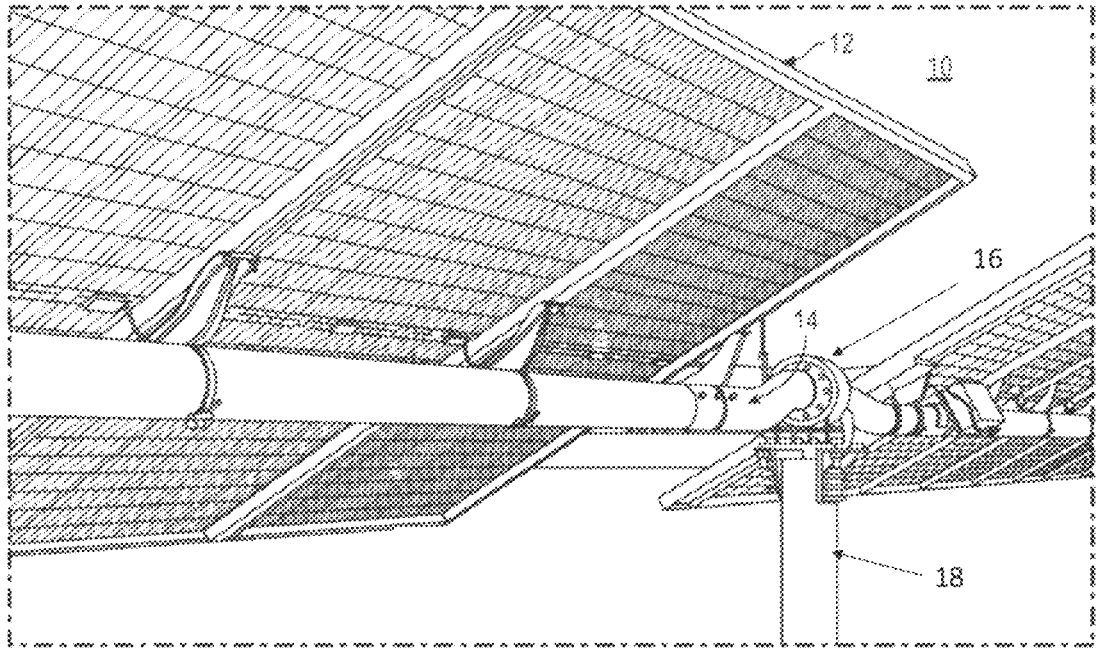
FIG. 1 is a perspective view of a solar tracking system provided in accordance with the present disclosure configured to articulate the angle of a solar array to track the location of the sun.

FIG. 1 depicts a bottom perspective view of a portion of a single-axis solar tracker 10, the solar tracker 10 includes a plurality of solar modules 12 mounted on a torque tube 14. A drive mechanism 16 is operably connected to the torque tube 14. As shown in FIG. 1, the torque tube 14 is connected to the drive mechanism 16 in an off-set manner (i.e., the axis of rotation of the drive mechanism 16 is offset from the longitudinal axis of the torque tube 14. The drive mechanism 16 is mounted on a pier 18 that is driven into the ground. A plurality of the piers 18 support the entirety of the solar tracker 10.

As depicted in FIG. 1, the drive mechanism 16 is a worm gear drive. The worm gear drive typically employs a single motor including a shaft on which a worm is mounted. The worm mates with a gear wheel, for example via a speed reducing gear or planetary gear set, such that rotation of the worm about a longitudinal axis that is coextensive with the axis of the shaft results in rotation of the gear wheel about an axis perpendicular to the longitudinal axis of the worm. The gear wheel is mounted in a housing and connected to at least one flange. The flange enables connection to the torque tube 14. As a result, excitation of the motor causes the worm to drive the gear wheel and the connected torque tube 14 rotates at the same speed as the gear wheel.

As will be appreciated, when the drive mechanism 16 is energized, the motor overcomes the forces of gravity and any wind loading experienced by the solar tracker 10 to drive the solar tracker 10 to a desired orientation to maximize the solar energy collection capabilities of the solar modules 12 mounted on the torque tube 14. In addition, the drive mechanism 16 must overcome any friction caused by the worm and other gears. Once the drive mechanism 16 is deenergized, however, there is risk that the solar tracker 10 can back drive resulting in a loss of the desired orientation. This potential is one reason that worm drives are often employed in solar trackers. The mating surfaces of the worm and the gear wheel are such that they have a relatively high incidence of friction, and thus when the drive mechanism 16 is no longer energized, this friction prevents back driving.

However, this resistance to back driving is not without costs. Those of ordinary skill in the art will recognize that the same friction which prevents back driving must then be overcome to initiate movement of the solar tracker and to maintain that motion. Thus, more energy is required to drive a solar tracker employing a worm gear and most of that energy is used to overcome friction, but nonetheless this tradeoff remains acceptable to much of the solar industry. At least a portion of the acceptance of this tradeoff is due to the centralization of both the mechanical driving of the solar tracker 10 and the electrical energization of the driving mechanism 16. However, this friction places limitations on the ultimate length of the solar tracker. Even in applications where other drive mechanisms are employed such as linear drives, again the pitch of the screws associated with the linear drives are selected to resist back driving.

This application is directed at addressing the shortcomings of the known drive systems and to provide a solution that reduces energy consumption by reducing the friction in the drive gearing, reduces the drive stress on the solar tracker as a result of the centralized drive mechanism 16, provides for a flexible architecture to cover a wider range of applications, has built in redundancies, a fault tolerant architecture, reduces cost, and enables utilization of commoditized components from other industries.

Figure 2:
FIG. 2 is a perspective view of a solar tracker in accordance with the disclosure.

FIG. 2 depicts a common arrangement of a solar tracker 10 formed of a plurality of bays 20 defined by the distance between piers 18. At each pier 18 is either a bearing 22 or generally near the center of the solar tracker 10 a drive mechanism 16. Each of the bearings 22 and the drive mechanism 16 are supported by one of the piers 18. Activation of the drive mechanism rotates the torque tube 14 (FIG. 1) about an axis of rotation and thus rotates the solar modules 12 mounted to the torque tube 14 such that the solar modules can be oriented to a desired position. That desired position may be to a position to capture maximum sunlight based on the location of the sun in the sky, that position may be to a 0-angle position during times of diffuse light, the desired position may be a safety position based on weather conditions such as high winds or a snow storm, or any position in between as desired by the operators of the solar power plant in which the solar tracker 10 is located given the current weather and atmospheric conditions, the current demands of the grid, and other factors. The bearings 22 reduce to the extent possible the resistance to movement of the torque tube 14 and the solar modules 12.

The torque tube 14 is sized (e.g., diameter, wall thickness, material) such that sag between the piers 18 is reduced or substantially eliminated and to absorb torsional loads applied to the torque tube 14 by wind loading. In addition, since there is just a single drive mechanism 16, the specifications for the torque tube 14 must also seek to eliminate twist of the torque tube 14 along its length. Any twist would result in the solar modules being oriented differently from what is desired, and thus again reduce the output and efficiency of the solar tracker 10, particularly, as the solar tracker is rotated to the extreme angles of permitted range (e.g., +/−60 degrees or more).

Figure 3:
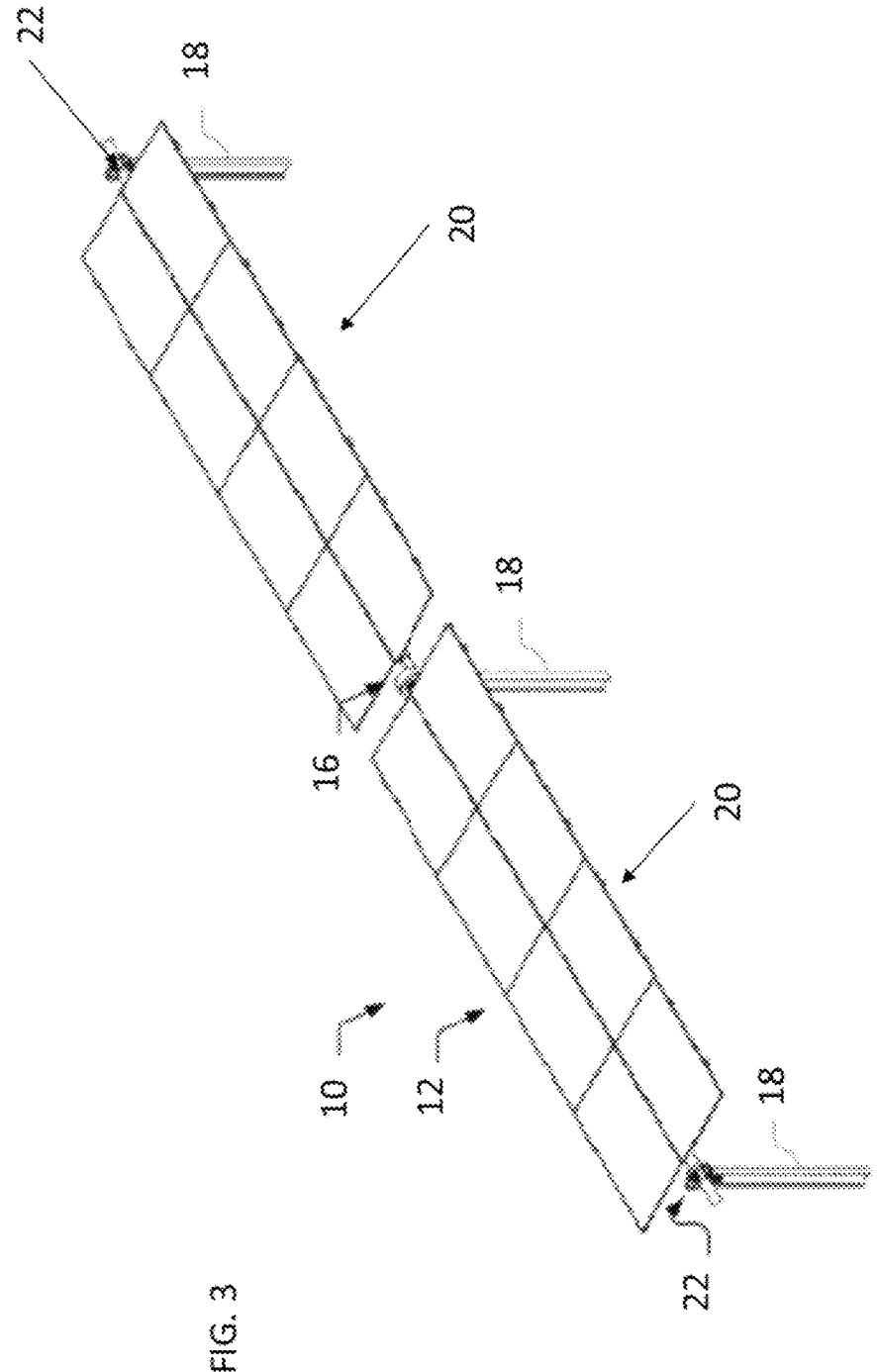
FIG. 3 is a perspective of a solar tracker in accordance with the disclosure.

FIG. 3 depicts a perspective of just two bays 20 of the solar tracker 10 of FIGS. 1 and 2. As can be seen in FIG. 3 as a result of the size of the drive mechanism 16, and the bearings 22, gaps are created between the solar modules 12 of neighboring bays 20. The result, as can be readily appreciated, is a reduction in the number of solar modules 12 that can be supported on the torque tube 14.

Figure 4:
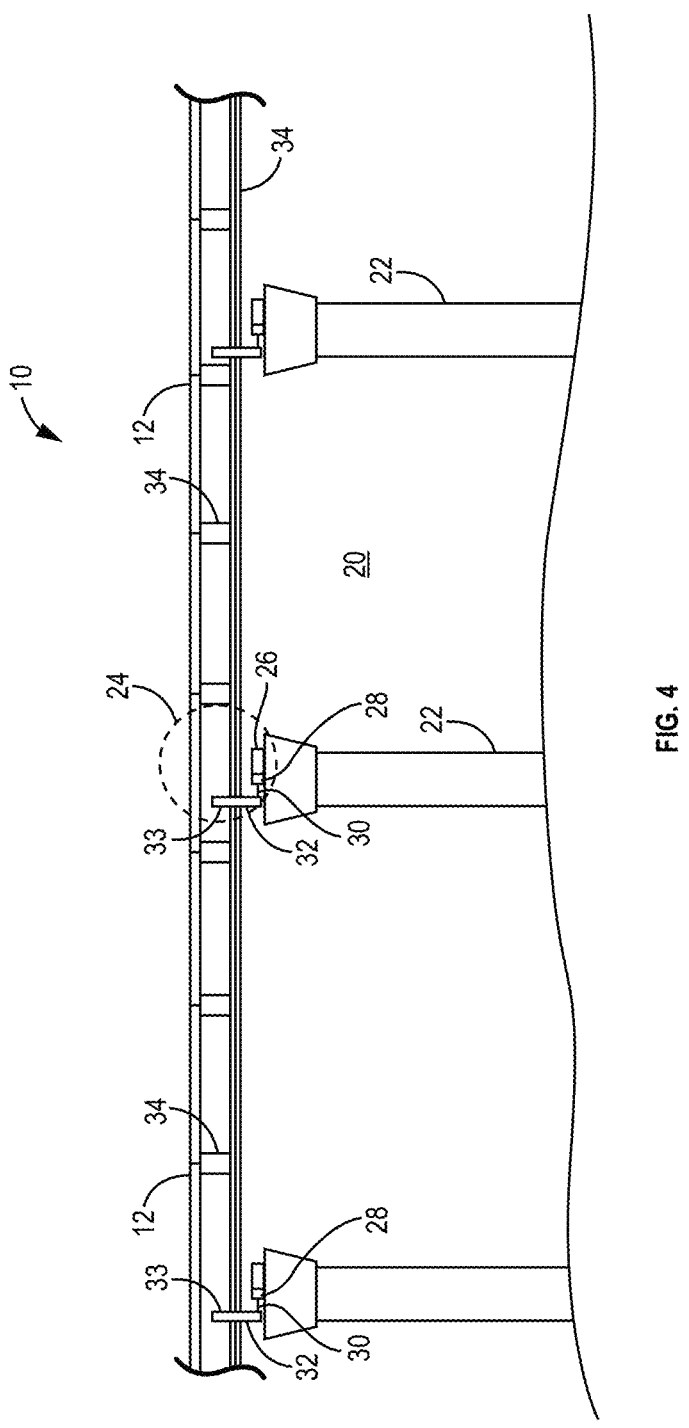
FIG. 4 is a profile view of a solar tracker in accordance with the disclosure.

FIG. 4 depicts a side view of a solar tracker 10 in accordance the disclosure. In contrast with the solar tracker 10 depicted in FIGS. 1-3, rather than having a drive mechanism 16 mounted on a single pier 18 in the middle of the solar tracker 10, each pier 18 includes a high efficiency drive mechanism 24 mounted on multiple piers 18 along the length of the solar tracker 10. Though depicted in FIG. 4 as including a high efficiency drive mechanism 24 on each pier, the disclosure is not so limited. Rather, the number of high efficiency drive mechanisms 24 may be determined based on the energy necessary to rotate the torque tube and then divided by the energy output of an output rating of a desired size of high efficiency drive mechanism 24. The result will reveal the number of high efficiency drive mechanisms 24 that are required on the individual solar tracker. The result may be a distributed drive system where, the drive of the solar tracker 10 is distributed along its length. However, in some applications the result may yield just one high efficiency drive is necessary for certain application of the disclosure.

As depicted schematically in FIG. 4, the high efficiency drive mechanism 24, comprises several features components including a motor 26, a high efficiency gear box 28, a shaft 30, and a driving gear 32 and a driven gear 33 that is mounted on the torque tube 14. Though not shown in FIG. 4, the high efficiency gear box 28 may include a braking mechanism (not expressly shown in FIG. 4 but described in greater detail elsewhere herein). As will be appreciated, because there are multiple high efficiency drive mechanism 24 the size (i.e., the output rating) of the motor 26 can be greatly reduced as compared to the motor used for the worm drive mechanism 16 of FIG. 1. This reduction in output rating allows for the overall size of the motor 26, the gear box 28, the drive gear 32 and the driven gear 33 to also be reduced. As one benefit of this reduction in size, the gaps between the solar modules 12 at each pier 18 of the solar tracker 10 depicted in FIG. 3 can be eliminated thus increasing the number of solar modules 12 the solar tracker 10 may bear over a given length and increasing the output of the solar tracker 10 for that given length.

With reference to FIG. 4 though shown as a driven gear 33 circumscribing the torque tube 14, the driven gear 33 may only partially circumscribe the torque tube and may define an arc of between 135-195 degrees, or any value of degrees therebetween. By reducing the angle of circumscription of the driven gear 33 to 180 degrees or less, the height of the supports 34 can be reduced.

The motor 26 may be a brushless direct current (DC) motor. In some instances, the DC motor may be without a hall effect sensor (e.g., a sensor less motor). Further, though reduction of the size of the motor 26 is one advantage of the solar tracker of FIG. 4 it is by no means the only advantage. As an initial matter, by reducing the size of the motor 26 the cost of the high efficiency drive mechanism is greatly reduced. Similarly, with the reduction in the size of the motor 26, the size of the gear box 28, shaft 30, the drive gear 32 and the driven gear 33 are also reduced in size, thus again reducing costs. In one example, the size of the motor 26 and gear box 28 is reduced. The motors for current worm gear drives employed on solar trackers are rated at about 5 kNm of maximum torque, the normal driving torque however, is only about 1 kNm to 2 kNm when the solar tracker is no experiencing any wind loading. This current worm gear drives also are typically rated for about 30 kNm of non-driving or back holding torque. That is the worm gear drive can withstand a high wind event loading the worm gear drive up to 28 kNm without allowing the solar tracker 10 to back drive. In accordance with the disclosure, because the high efficiency drive mechanism 24 may be designed to permit back driving of the solar tracker 10 the AChigh efficiency drive mechanism 24 need not withstand the 28 kNm of non-driving torque, thus the size of the motor 26 and gear box 28 may be reduced. Further, if multiple the high efficiency drive mechanisms 24 are employed along the solar tracker 10, for example two, then the size of the motor 26 can be further reduced. For example, if two high efficiency drive mechanisms 24 are employed, then each motor 26 need only be rated to 2.5 kNm to achieve the desired operational torque ranges.

Along with other benefits of distributing the drive mechanism, as shown in FIG. 4 is that the gearing employed in the high efficiency gear box 28 introduces relatively little friction into the system. This is in stark contrast to the worm gear systems described above. The use of the high efficiency gear box 28, gears with a relatively low incidence of friction between them, allows the gears and therewith the torque tube to which they are connected to be driven with less energy. As noted above, one of the major factors in sizing the motor to drive the worm gear drive is the energy needed to overcome the friction in the gearing that prevents the back driving of the solar tracker. Thus, by utilizing high efficiency gears, as described herein, there is less friction to overcome when seeking to drive the torque tube 14 and therewith the solar tracker 10 to a desired orientation and therewith improving the overall operational efficiency of the solar tracker 10.

Current worm gear drive systems which have a gear ration of typically between 40:1 and 50:1, employ, for example ACME threads at 5 turns per inch and are by design non-back drivable. The result is that such worm gear drive systems have a mechanical drive efficiency of 40% or less. This level of efficiency is a result of the constant sliding contact of the worm gear, connected to the motor, with the spur gear they typically drive.

In contrast, high efficiency gears can achieve an efficiency of 90% or greater. The high efficiency gears, which may be one or more of planetary, helical, spur gears, bevel gears, face gears, spiral bevel gears, and others are design to minimize sliding contact, and are also therefore easily back drivable.

Figure 5:
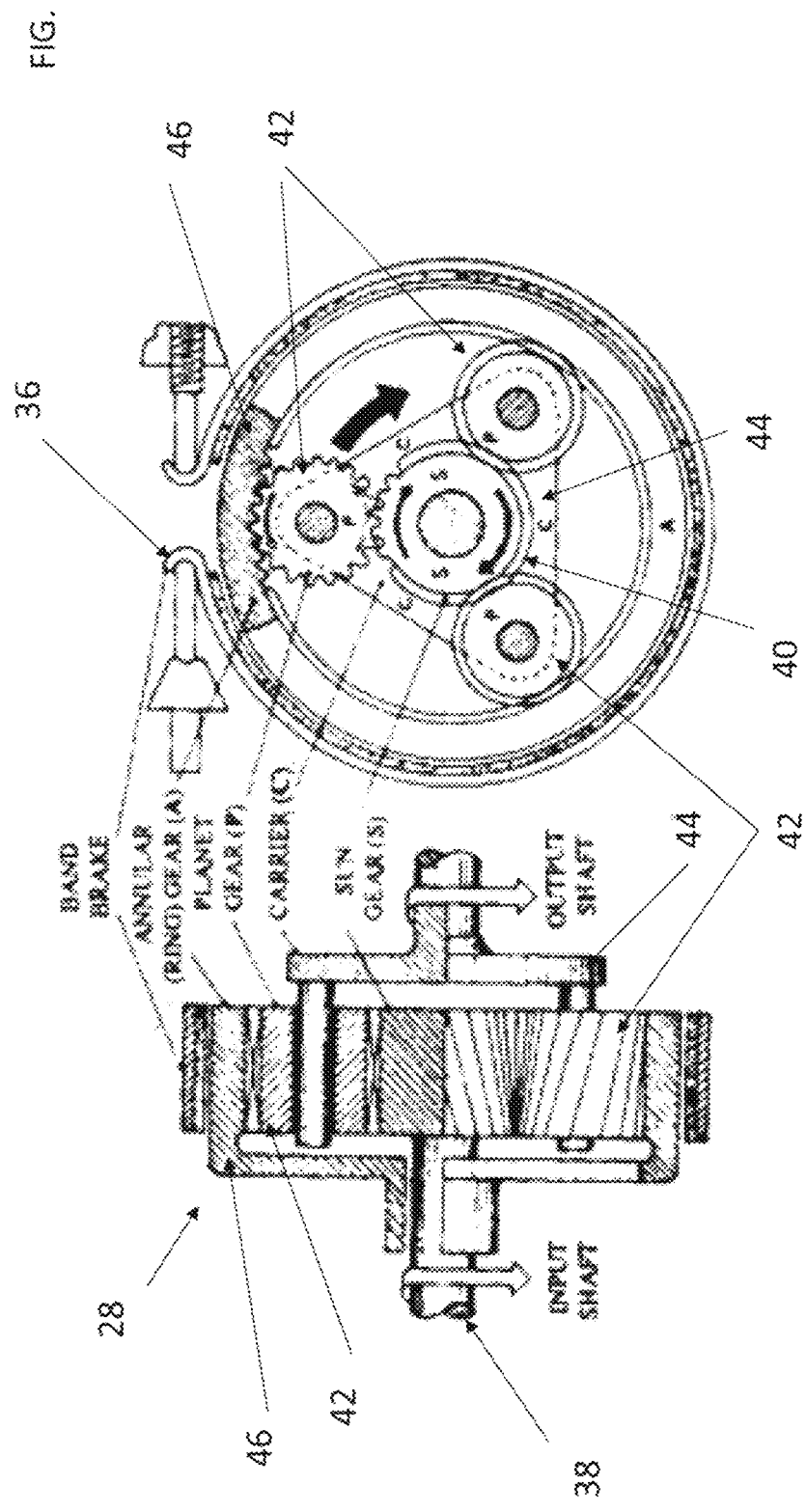
FIG. 5 depicts a cross-sectional and end view of a brake in accordance with the disclosure.

As will be readily appreciated, the use of high efficiency gear box 28 results in there being little resistance to back driving of the solar tracker 10 as described above. To prevent back driving a high efficiency gear box 28 a brake 36 as shown in FIG. 5 may be employed. In one example of the disclosure the motor 26 includes a shaft 38 which connects to the high efficiency gear box 28 employing a planetary gear arrangement. As shown, the shaft 38 includes a sun gear 40 mounted on an end of the shaft 38 opposite the motor 26. The sun gear 40 is surrounded by three planetary gears 42 mounted on a carrier 44. The planetary gears 42 rotate within a ring gear 46. An output shaft 30 (also shown in FIG. 4) mates with the drive gear 32 and interfaces with the driven gear 33 mounted on the torque tube 14. The result is that the rotation of the sun gear 36 is transferred through the planetary gears 38, ring gear 42, drive gear 32 and driven gear 33 such that despite the motor spinning shaft 38 and sun gear and sun gear 40 at for example 1800 rotations per minute (RPM) the drive gear 32 rotates at a small fraction of that rate, such that the driven gear 33 moves at a very slow rate enabling the solar tracker to be moved in accordance with the path of the sun though the day. As an example a reduction of between 36,000 to 1 or 30,000 to 1 may be appropriate in some instances. Though described in conjunction with the above complex gearing, simplified gearing mechanisms and geometry may be employed without departing from the scope of the disclosure.

As noted above, in accordance with the disclosure the worm gears of the prior systems may be replaced with other higher efficiency gears (e.g., planetary gears) to greatly improve the efficiency. Worm gear drive systems typically already employ a first planetary gear which is used to reduce the speed of rotation of the worm gear. Thus, in accordance with the disclosure, the worm gear may be replaced with another stage of planetary gears. In accordance with aspects of the disclosure motor 26 may rotate at about 3000 rpm. The first planetary gears, as currently employed (e.g., a four stage planetary gear) has an output of about 5 rpm. By replacing the worm gear with a second planetary gear (e.g., a three stage planetary gear), the output of the second stage may be at the torque tube drive speed (e.g., sufficient to achieve sun tracking). As noted above, this greatly increases the efficiency. As a result, a reduction of just 17,000:1 or 10,000:1 or even less may be possible. The final reduction is a balancing of the torque needs of the solar tracker, the ability to effectively move the solar tracker during day light hours, and the ability to move the solar tracker quickly (i.e., at a relatively high speed) when needed (e.g., stowing in advance of a sudden storm).

Though described herein as replacing worm gear drive system with alternative gears, the disclosure is not so limited. Instead, the pitch of the worm gear may be altered. As noted above, current worm gears employed in a solar tracker 10 have a pitch angle or helix angle of 5 or 6 degrees. This prevents back driving of the solar tracker, but at the price of efficiency as noted above. In addition to the options provided above, a worm gear may be employed in high efficiency gear box 28, however, the pitch or helix angle is increased to between about 30 to 40 degrees. This change in angle reduces the sliding friction of the worm gear, and thus allows the solar tracker to back drive, but increases the efficiency from about 40% to about 70%. Accordingly, though not providing the highest efficiency solution, higher efficiency worm gears may be employed in the high efficiency gear box 28, without departing from the scope of the disclosure.

In accordance with one aspect of the disclosure brake 36 acts on an outer surface of ring gear 46. Thus, providing a relatively larger surface area upon which to apply the brake 36. The brake 36 may be connected to an electro-mechanical actuator (not shown). Upon application of an electrical signal the actuator advances releasing the brake. However, once the signal is removed the actuator returns to an unadvanced state, allowing the brake, for example through spring force to reapply pressure to the outer surface of the ring gear 46. In this manner, the fault position for the brake 36 if there is no signal applied to actuator is applying force resisting the rotation of the solar tracker 10, and particularly the torque tube 14. This provides a fail-safe environment for the solar tracker 10 and preventing uncontrolled movements of the solar tracker 10 if there should be a power failure or signal loss. Further the total holding capacity of all of the brakes 46 is selected to be greater than the moment generated by the highest design wind speed for a given location. Though described herein as a band brake, the brakes 46 are not so limited and may be embodied in disc brakes, drum brakes multiple plates with smooth, textured serrated, or corrugated contact surfaces.

The electro-mechanical release of the brakes 36 can be achieved by one or more of a cam action, a linkage, a solenoid, and electro-magnet, a stepper motor, or other similar actuation devices that can be driven by a relatively low voltage (e.g., 5V, 12V, 24V) to open the brake 36 and release them from actuation. Further, though shown herein with the brake 36 being applied to the ring gear 46, the instant disclosure is not so limited and the brake 36 may be applied to any stage of the motor shaft 34 and the high efficiency gear box 28 including the output shaft 30, any of the intermediate gears 38, 40, 46. Additionally, the brake 36 may be mounted directly on the torque tube 14 to prevent the rotation of the torque tube 14 separate from the motor 26 and the high efficiency driving mechanism 24.

In a further aspect of the disclosure, a mechanical brake 36 is not required. Rather, each motor 26, which includes permanent magnets on the rotor, may have its windings shorted (e.g., by controller 200 FIG. 12) at times where braking is desired. The shorted windings create a resistive holding torque (e.g., a magnetic braking force) slowing or stopping rotation of the motor 26 and the solar tracker 10 mechanically coupled thereto. In accordance with the disclosure the windings can be shorted to a known resistance to modulate the electromagnetic holding torque or resistance to driving by the interaction with the permanent magnets. The magnitude of the magnetic braking force, and therewith the permitted speed of rotation of the torque tube 14, can be adjusted by actively adjusting the winding resistance (e.g., engaging different levels of resistance to the windings. Those of ordinary skill in the art will recognize that an open circuit will result in zero braking effect.

In accordance with the disclosure, when weather conditions indicate that tracker 10 should move to a stow position the power supplied to motor 26 may be interrupted. Thus, the solar tracker is no longer positively driven by motor 26. The solar tracker 10 is then allowed to rotate with the wind providing the motive force (i.e., back driven or forward driven) to reach the stow position. By shorting the windings of the motor 26 and adjusting the resistance of the drive circuit of motor 26, the permanent magnets of the motor brake the rotation of the solar tracker 10 to slow the rate of rotation and prevent damage to the solar tracker 10 as it approaches the mechanical stops of the solar tracker 10 in the stow position.

As will be appreciated, because the high efficiency drive mechanisms 24 are distributed along the length of the solar tracker, the amount of braking force that each brake 36 must apply to their respective ring gear 46 is reduced to achieve the same braking force as achieved by the high friction arrangements as depicted in FIG. 1. This, reduction in force applied at any one location both when the motor 26 is driving the driven gear 33, and when the brake 46 is applying force to the ring gear 46 to stop the motion solar tracker and resist, for example, wind loading reduces point loads and distributes the driving and braking loads along the length of the torque tube 14. As will be appreciated, by distributing the loads the potential for twisting of the torque tube during driving or breaking is reduced. Thus, as noted above, the size of the motor 26 can be greatly reduced, but in addition, the dimensions of the torque tube 14 itself can be reduced. This may be a reduction in diameter, wall thickness, composition, or a combination of these and other factors.

In accordance with a further aspect of the disclosure, the motors 26 are sized such that failure of one or more of the brakes 36 along the length of the torque tube 14 causing the brake 36 to engage can be overcome by the remaining high efficiency drive mechanisms 24, and particularly the motors 26. In this manner the solar tracker 10 can continue operating as normal even if one of the brakes 36, motors 26, or high efficiency gear boxes 28 fail providing system redundancy, and a robust platform for continued operation. Still further, operations for a solar tracker 10 need not be interrupted to service the component suffering the failure. Moreover, due to the reduced size of the motor 26 and high efficiency gear box 28, such maintenance becomes an easier task that can be manually performed without the need for a crane or other heavy lift mechanism as might be required if a drive mechanism 16 (e.g., a worm gear drive, FIG. 1) is employed. The motors 26 can be selected with a rating sufficient to overcome 1, 2, 3, 4 or more simultaneous failures of high efficiency drive mechanisms 24 and continue operation. Each of the brakes 36 is configured such that the torque tube 14 can be driven or back driven by the remaining motors 26 without damaging brakes 36.

Figure 6:
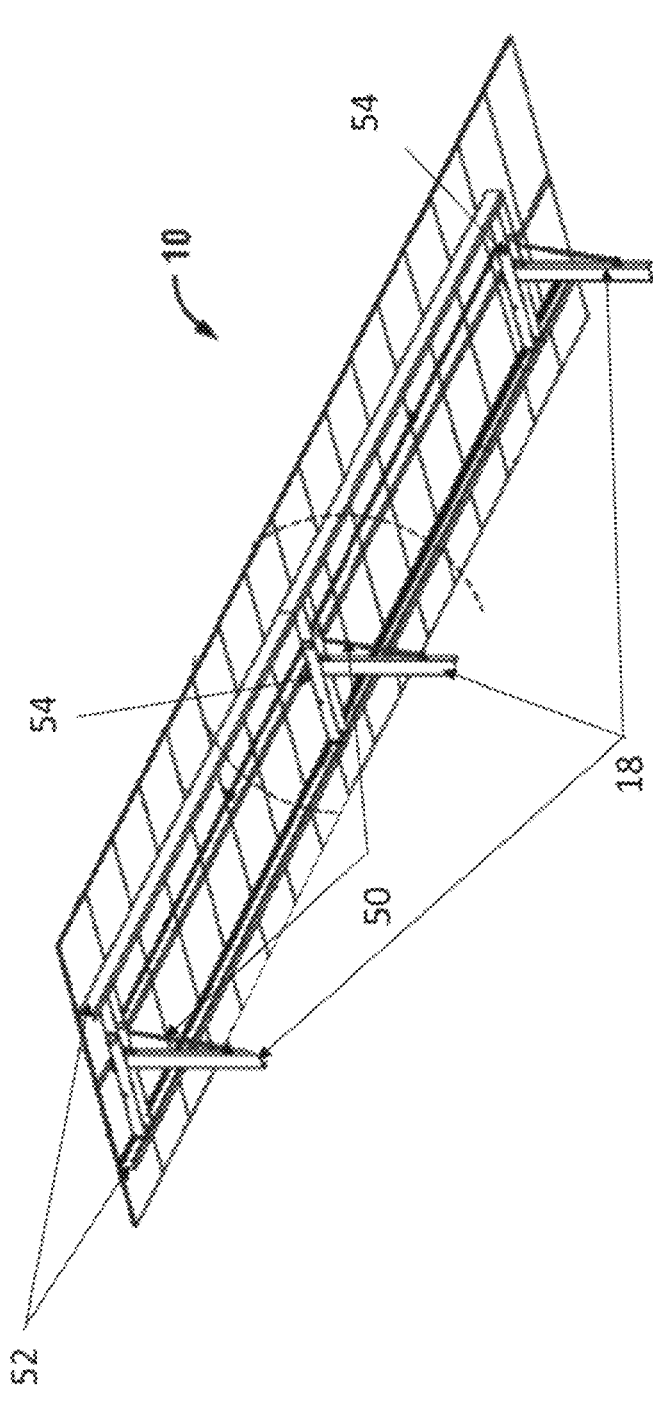
FIG. 6 is a perspective view of a solar tracker in accordance with the disclosure.

Though described herein above in connection with a rotary drive mechanism, the disclosure is not so limited. FIG. 6 depicts a solar tracker 10 employing a plurality of linear actuators 50 along its length. As with the solar tracker 10 of FIG. 1, the solar tracker 10 of FIG. 6 rotates around a central axis as defined by a bearing supported by each pier 18. As shown, rather than a single torque tube, the solar tracker 10 of FIG. 6 has a pair of support rails 52 that run substantially perpendicular to the orientation of the piers. Spanning the support rails 52, at each pier 18 are one or more crossbars 54. A bearing rotatably connects crossbars 54 to the piers 22. A liner actuator 50 is connected at one end to the pier 18 and at a second end the one or more crossbars 54.

Figure 7:
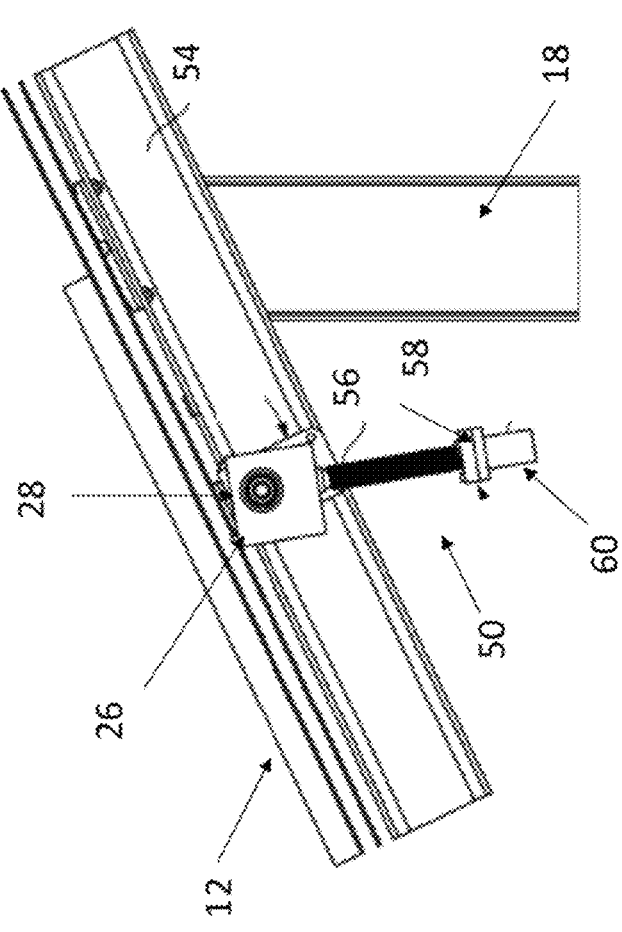
FIG. 7 is a profile view of a portion of the solar tracker of FIG. 6.

As shown in FIG. 7, each linear actuator 50 includes a motor 26 which includes a high efficiency gear box 28. An output of the high efficiency gear box 28 connects to screw 56. A nut 58 is mounted on a sleeve 60. One end of the sleeve 60 is secured to the pier 18. The screw 56 threads into the nut 58 and when driven in a first direction drives the screw 56 into the nut 58 and sleeve 60 such that the total length of the linear actuator 50 decreases. When the screw 56 is driven in a second direction, the screw 56 is driven out of the nut 58 and the sleeve 60 such that the total length of the linear actuator 50 increases.

The motor 26 is substantially as described above and may include a brake. The high efficiency gear box 28 may include a pair of bevel gears or face gears or other gearing arrangement mechanically connecting motor 26 screw 56. As will be appreciated, the high efficiency gear box 28 may further include a gearing arrangement to reduce the speed of rotation (i.e., RPM) of the screw 56 in comparison to the speed of rotation to the motor 26.

As with other embodiments herein, not each pier 18 need have a linear actuator 50 to control the movement of the solar tracker 10 as it is rotated about the bearing mounted on the pier 18. Further, due to the brake 36 that is incorporated into the motor 26 or high efficiency gear box 28, the shape of the threads formed on the screw 56 may be formed of a high-efficiency thread shape. For example, if the screw 56 has an ACME thread pitch of greater than 5 threads per inch, the overall drive efficiency is increased, at the cost of reduced mechanical advantage but that impact is largely negated here as back driving is to be permitted. This high-efficiency thread shape may be selected such that the friction between the screw 56 and the nut 58 is reduced allowing for very low friction operation. Thus, the overall energy required to rotate the solar tracker 10 and the solar modules mounted therein is reduced. Still, further, the motors 26 may be sized such that if one or more of the motors 26 or brakes 36 should fail such that the brakes 36 are engaged while the remaining motors 26 seek to rotate the solar tracker 10, the solar tracker 10 remains rotatable and the added friction and resistance to rotation by the failed brake 36 or motor 26 can be overcome. This, as noted above, enables continued operation until the motor 26 or high efficiency gear box 28 can be serviced and returned to normal operation. As will be appreciated, the motors 26 may be sized such that multiple failures may be overcome without departing from the scope of the disclosure. Additionally or alternatively, recirculating ball actuators or ball screws may be employed in places of the screw 56, to further improve efficiency. As will be appreciated, replacement of the sliding contact of the screw 56 and nut 58 with the rolling elements of a recirculating ball screw will decrease the overall friction of the linear actuator 50 and the drive energy required for the solar tracker 10.

Figures 8, 9:
FIG. 8 is a profile view of a solar tracker bearing in accordance with the disclosure.
FIG. 9 is a profile view of a solar tracker bearing in accordance with the disclosure.

FIG. 8 depicts a bearing 100 that may be employed as an alternative to the bearings described herein above. The bearing 100 includes a rotatable frame 102 having formed therein an opening 104 designed to receive the torque tube 14, not shown. In this instance the toque tube 14 has a D-shape matching the opening 104 and is held in place by a locking mechanism 106 closing the opening 105. Though as will be appreciated other shapes including round, square, rectangular, octagonal and others without departing from the scope of the disclosure. The rotatable frame 102 has a half-round shape with a substantially flat top surface 108. The top surface 108, when the solar tracker 10 is assembled, will be substantially parallel to the light receiving surface of the solar modules 12.

Formed in the rotatable frame 102 is a slot 110. The slot 110 has an arcuate shape, though may have other shapes without departing from the scope of the disclosure. A stationary frame 112 includes two pinion gears 114 supported by bushings 115. The pinion gears 114 have teeth which mate with rack teeth 116 formed on at least one interior surface of the slot. Though shown in FIG. 8 as rack teeth 116 on just one surface of the slot 110, the rack teeth 116 may be formed on both sides of the slot 110. A motor 26, which may include a high efficiency gear box (not shown) similar to the high efficiency gear box 28 which reduces the speed of rotation of the pinion gear 114 to one effective for rotating a solar tracker 10. As shown in FIG. 8, the rotatable frame 102 has been rotated to an extreme position where the solar tracker 10 would be angled at its extreme angle, for example –65 degrees, such as might be expected for the solar tracker 10 at sunrise to maximize east facing exposure of the solar modules 12.

As with other examples in this disclosure, the bearing 100 need not be implemented on every pier 18, and instead may be implemented on every second or third or other multiple of piers 22. On the intervening piers 22 a bearing 150 as shown in FIG. 9 may be employed. The bearing 150 is quite similar to that of FIG. 8 except rather than a pinion gear 114 located on the bushings 116, a pair of rollers 152 are employed. The rollers 152 engage the slot 110, which unlike that of FIG. 8 has a flat or smooth surface allowing the rotatable frame 102 to smoothly and with very little frictional interference to rotate. As shown in FIG. 9 the bearing 150 is at a 0-degree position, for example as may be expected when the sun is directly above the solar tracker 10.

Figures 10, 11:
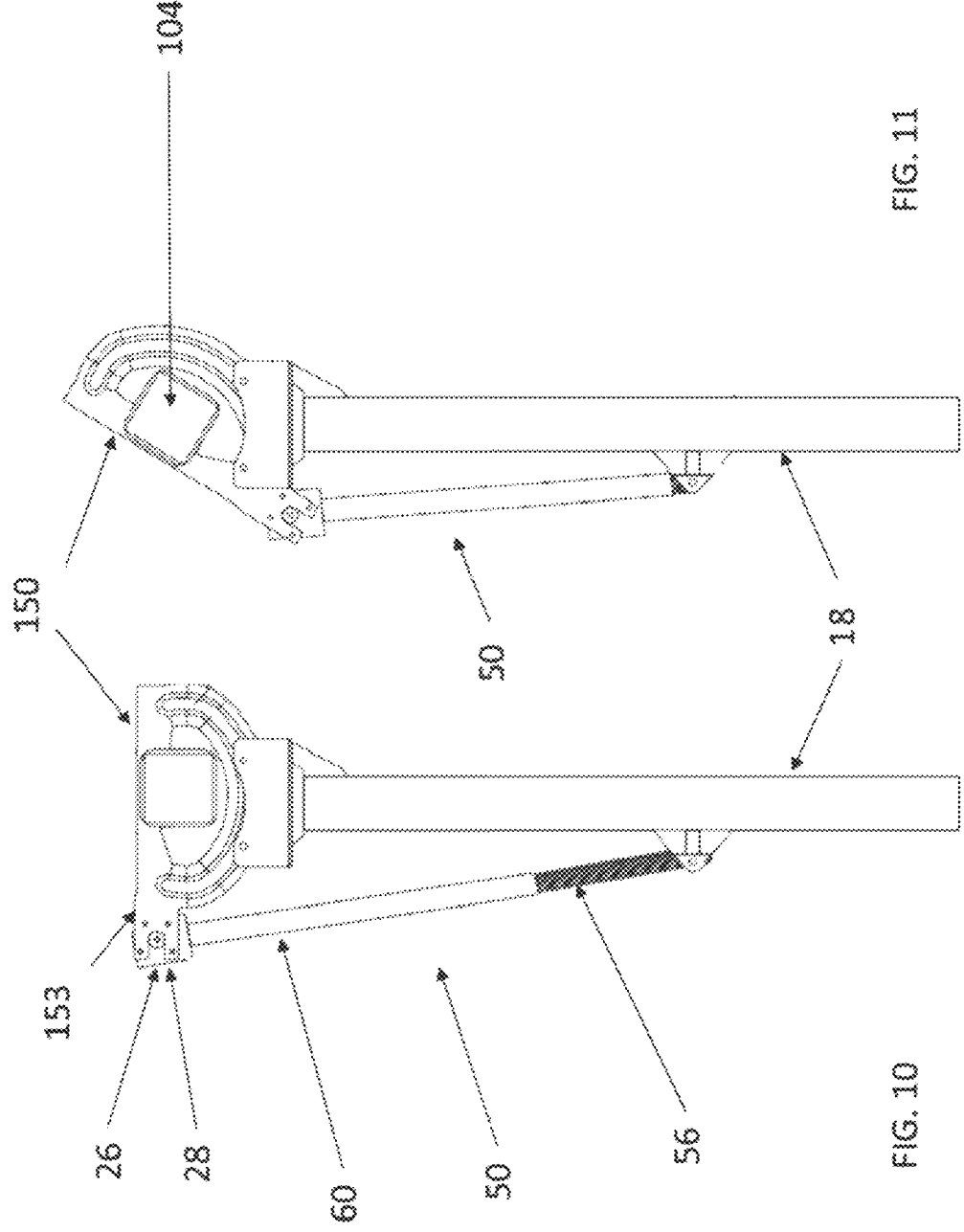
FIG. 10 is a perspective view of a linear drive and solar tracker bearing assembly mounted on a pier in a first position in accordance with the disclosure.
FIG. 11 is a perspective view of a linear drive and solar tracker bearing assembly mounted on a pier in a second position in accordance with the disclosure.

FIG. 10 provides yet another alternative employing a combination of the linear actuator 50 of FIG. 5 in combination with the bearing 150 of FIG. 9. In the example of FIG. 10 the bearing 150 includes an arm 153 to which the linear actuator 50 is connected on one end. The motor 26 and high efficiency gear box 28 are mounted to the arm 150 drives the extension and retraction of the screw 56, in a manner described above. The motor 26 and high efficiency gear box 28 are rotatably secured to arm 153 enabling the rotation of the motor 26 and high efficiency gear box 28 observed by the comparison FIG. 10 and FIG. 11 as the screw 56 is being retracted into the sleeve 60 and causing the bearing 150 to rotate to an extreme position. As can be seen in FIG. 10, and as described above, the opening 104 has a square shape.

Thus, in view of the above, despite the differences in mechanism, the use of multiple motors 26 and gear boxes 28, each of which operates in conjunction with a brake 36, enables the distributed and high-efficiency drive of the solar tracker 10. This distributed drive using multiple independent brakes 36 enables the use of multiple smaller motors 26 and high-efficiency gear boxes 28 reducing the friction as compared to centralized drive mechanisms. The multiple motors 26 can overcome the failure of one or more of the motors 26, high efficiency gear boxes 28 or brakes 36 and continue normal operation, perhaps at increased power consumption to overcome the additional friction and resistance to motion from the failure and to prevent back driving of the solar tracker 10 by wind loading and other factors. Further, even if just a single high efficiency drive mechanisms 24 is employed on the solar tracker 10, by allowing for back driving in high wind events (e.g., in excess of a given wind speed) the overall efficiency is still greatly increased due to the overall removal of the high friction components that are currently utilized to withstand wind loading and to prevent back driving.

As will be appreciated the distributed high efficiency drive solar tracker 10 described herein above is a mechanical structure that may be hundreds, even thousands, of feet in length. The use of multiple motors 26, high efficiency gear boxes 28 and brakes 36, however, requires a high level of coordination to ensure that the motors 26 and electromechanical actuator to release the brakes 36 are energized and actuated properly. A further aspect of the disclosure is directed to a control architecture to achieve the high level of coordination.

Figure 12:
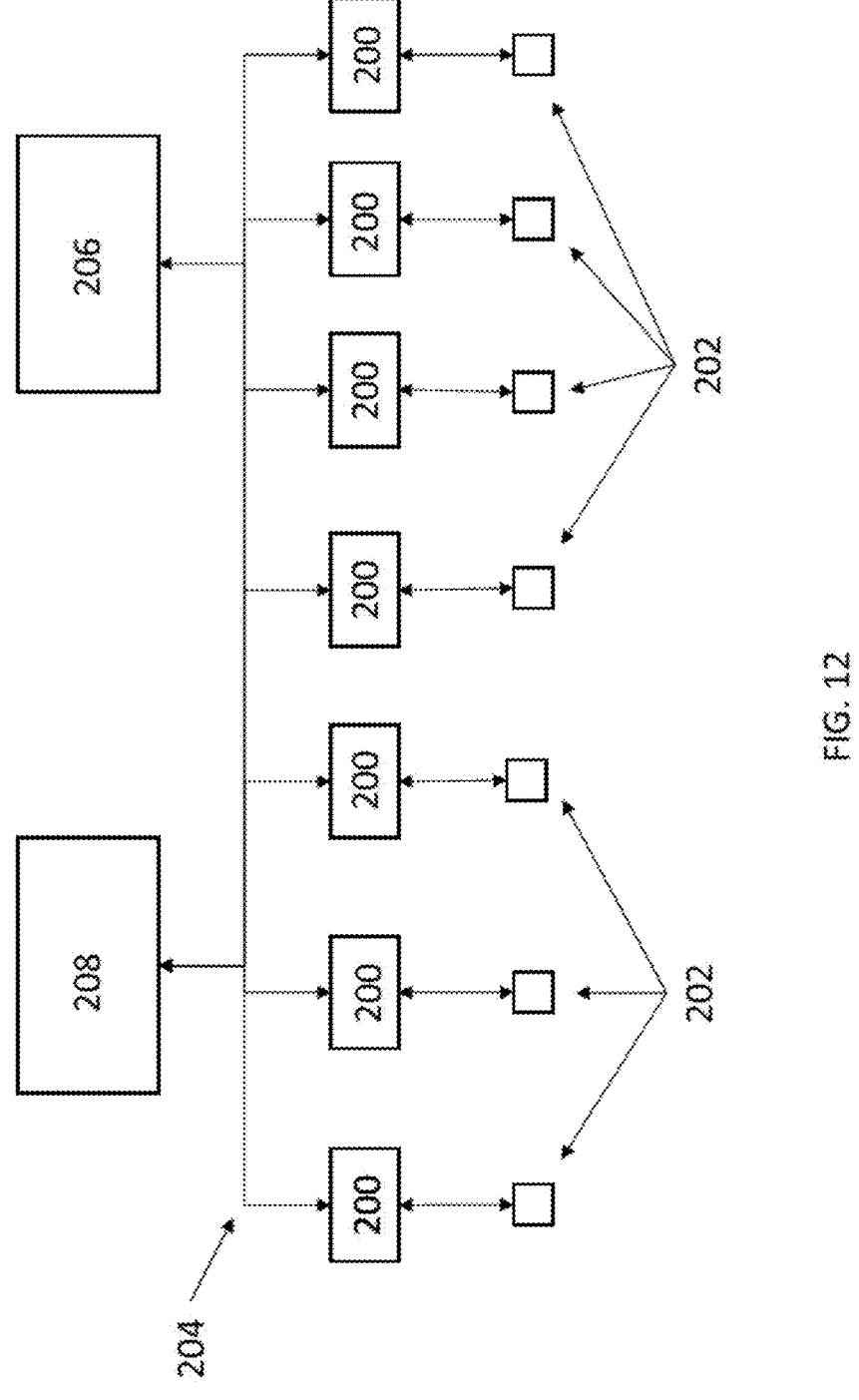
FIG. 12 is a schematic view of a solar tracker control system in accordance with the disclosure.

As depicted in FIG. 12 a further aspect of the disclosure is directed to a control architecture that includes a distributed motor controller 200 located proximate or even on board with each motor 26. The distributed motor controller 200 receives inputs from one or more sensors 202. The sensors 202 may measure one or more of current or voltage of the motor, current or voltage of the electromechanical actuator for the brake 36, a position of the solar tracker 10 or brake 36, force applied by the motor, force applied by the brake, torque applied by the motor, or other electrical aspects of the high-efficiency drive. In some instances, position sensors are one or more of displacement sensors, angular tilt sensors, single "home" sensors combined with a rotary encoder to count revolutions, and other types of sensors. A power cable 204 connects the distributed motor controller 200 to a master control unit 206. The power cable 204 is configured not just to provide energy from a central power supply 208 to the motor 26 but also configured to carry control signals from the central control unit 206 to the distributed motor controller 200 and the electromechanical actuator for the brake 36.

As will be appreciated, command signals from the master control unit 206 intended for each of the multiple motors 26 and the electromechanical actuators for the brakes 36 trigger switching at the distributed motor controllers 200 to enable the application of energy from the central power supply 208 to drive the motors 26 and the electromechanical actuators of the brakes 36. The coordinated release of the brakes 36 and the application of energy to the motors 26 enables the solar tracker 10 to be driven as needed to arrive at a desired position (e.g., based on position of the sun in the sky, diffuse light positions, wind stowage positions, and others). The sensors 202 feedback relevant data to the master control unit 206. The master control unit 206 employs a logic and can make determinations regarding the status, condition, position and other data related to solar tracker 10.

Additionally or alternatively, the sensors 202 are wind sensors or the master controller 206 is configured to receive wind speed and direction information (e.g., from an internet or forecasting source or from a sensor located elsewhere in the site). The wind speed and direction are utilized to determine when a solar tracker 10 should be driven to a stow position for safety reasons. The master controller 206 can direct the breaks 36 or motor 26 to drive the solar tracker 10 or allow the solar tracker 10 to be driven in a controlled manner by the wind to achieve a desired wind stow position that will ensure the safety of the solar modules 12 on the solar tracker 10.

The central power supply 206 may be of a modular construction allowing it to be appropriately sized for the given solar tracker 10. As will be appreciated, a smaller solar tracker 10 will not require as large of a central power supply 206 as might a larger solar tracker 10, based on the number of motors 26 to be driven and the number of electromechanical actuators for the brakes 36 to be released. Further, the power cables 204 and their connectors may be standardized for compatibility and ease of installation.

In accordance with the disclosure, master control unit 206 includes a computer readable recording medium or may be connected to a cloud-based data storage system. One or more processors in the master control unit 206 execute one or more applications stored in the computer readable recording medium. The one or applications may provide a methodology for driving the high-efficiency drive systems described herein to move the solar tracker 10 to a desired position. These applications may have many inputs including the anticipated location of the sun at all times of the day. This may provide the baseline for the intended position to drive the solar tracker 10 throughout the day. The application may also be more complex and incorporate knowledge of the terrain, spacing of the solar trackers and other factors. Those of ordinary skill in the art will recognize that limiting shading, even where the solar tracker 10 no longer directly follows the sun will result in greater energy capture than allowing the solar modules 12 to become shaded by a neighboring solar tracker 10 or other near field obstructions. To achieve the desired movement of the solar tracker 10, the application may determine the current position of the solar tracker 10, determine an amount of desired movement, and then send control signals from the master control unit 206 to the distributed controllers 200. The distributed motor controllers 200 (one for each motor 26 and brake 36) can energize the motor 26 and the electromechanical actuator for the brake 36. A clock signal that is associated with the master control unit 206 and the distributed motor controllers 200 ensures that each of the motors 26 and brakes 36 of the given solar tracker 10 are energized at the same time to ensure smooth operation of the solar tracker 10.

A further aspect of this disclosure is directed to a solar tracker 10 and a high efficiency drive mechanisms 24 that does not employ a mechanical brake. Rather the motor 26 is employed in combination with the high efficiency gear box 28 to control the orientation of the solar tracker 10. In times of external loading (e.g., wind loading, snow loading, etc.) the motor 26 may be controlled (e.g., via central controller 206 or distributed controller 200) to control back driving of the solar tracker 10 to a stow position. Rather than combat the external loading, the motor 26 can have its current or voltage adjusted such that the external loading can overcome the output of the motor 26 allowing the external loading to back drive the solar tracker 10. However, by continuing to drive the motor 26, the back driving of the solar tracker 10 can be controlled and the motor 26 acts as an electrical brake on the back driving of the solar tracker 10. Depending on the magnitude of the loading (e.g., wind speed) to power (current or voltage) applied to the motor 26 to counter the external loading can be reduced to allow the torque tube 14 and the solar modules 12 mounted thereon to be back driven by the wind or snow. The output of the motor 26 controls this back driving and allows the torque tube 14 and the solar modules 12 to be safely rotated by the external loading. As the external loading (e.g., wind) abates, the motor 26 may now overcome the effects of that loading and again drive the solar tracker 10 to its desired orientation given the time of day and location of the sun in the sky.

In some embodiments, the current or voltage supplied to the motor 26 is not reduced but is essentially constant, and as the external loading increases, controlled back driving occurs without a change in operation of the motor 26. However, if the speed of rotation of the torque tube exceeds a threshold, the current or voltage applied to the motor 26 can be increased to increase the breaking force applied to the torque tube 14, and to slow the back driving of the solar tracker 10. In some instances, the solar tracker 10 is allowed to be completely back driven to an end of travel location, however, in many wind conditions, though exceeding a threshold such that back driving occurs, the solar tracker 10 may only be back driven to an interim position between the 0-degree (flat position) and the end of travel (substantially vertical) position.

Because the solar tracker 10 has solar modules 12, or portions of solar modules 12 on both sides of the torque tube 14, the wind loading, or other external loading applied to the solar modules 12 does not drive the solar tracker in just one direction. Rather a portion of that loading seeks to rotate the torque tube in a first direction and a second portion of that loading seeks to rotate the torque tube in a second opposite direction. Depending on the orientation of the torque tube 14 and the solar modules 12, external loading (e.g., high winds) can either rotate the solar modules 12 with the wind, or in some instances actually force the solar modules into the wind. In accordance with the disclosure, not only can the current or voltage applied to the motor 26 be adjusted, but also the polarity. If for example, the motor 26 is initially driving the solar tracker in a first direction and the external loading seeks to force the solar tracker 10 in that first direction, the polarity of the voltage applied to the motor 26 may be reversed, to slow the movement of the solar tracker 10 and to counter the external loading.

In a further aspect of the disclosure the central controller 206 or the distributed controllers 200, can adjust the current or voltage applied to the motor 26 by considering the input from the sensors 202. The sensors may be wind sensors providing local wind speed and direction information but may also be current sensors detecting the current applied to the motors 26, position sensors providing an indication of the orientation of the solar tracker 10, or other sensors and combinations of these sensors without departing from the scope of the disclosure. The sensor outputs from the sensors 202 are feedback that can be analyzed by the central controller 206 or the distributed controller 200 to adjust the current, voltage (e.g., polarity) applied to the motor.

The highest wind loading is typically experienced by the solar trackers 10 that are on the ends of the solar power plant. Thus, typically the solar trackers 10 on the ends (either the outer most or the first two or three solar trackers) can act as a wind fence for the interior solar trackers 10. Wind striking the solar modules 12 on the outer rows of solar trackers 10 in the solar power plant is forced vertically by the angulation of the solar modules 12. This change in direction creates turbulence and reduces the impact of the wind loading on the interior rows of the solar trackers 10. In the context of the instant disclosure, the central controller 206 or the distributed controllers 200 may thus enable different wind loading responses to individual solar trackers 10 based on their location within the solar power plant. As an example, while windward most row of solar trackers 10 or the windward most two or three rows of solar trackers 10, may be permitted to back drive, as described herein, to a stow position based on the windspeeds, because the effective wind speed experienced by the interior solar tracker 10 is reduced by the wind fencing effect of the windward solar trackers 10, the interior solar trackers 10 may continue following the sun in their normal course of operation, or in diffuse light conditions be placed in an orientation to maximize electrical production for the given light conditions. Accordingly, the overall production of the solar power plant can be increased despite the high wind speed conditions affecting the windward most solar tracker 10 or windward most 2 or 3 solar trackers.

Figure 13:
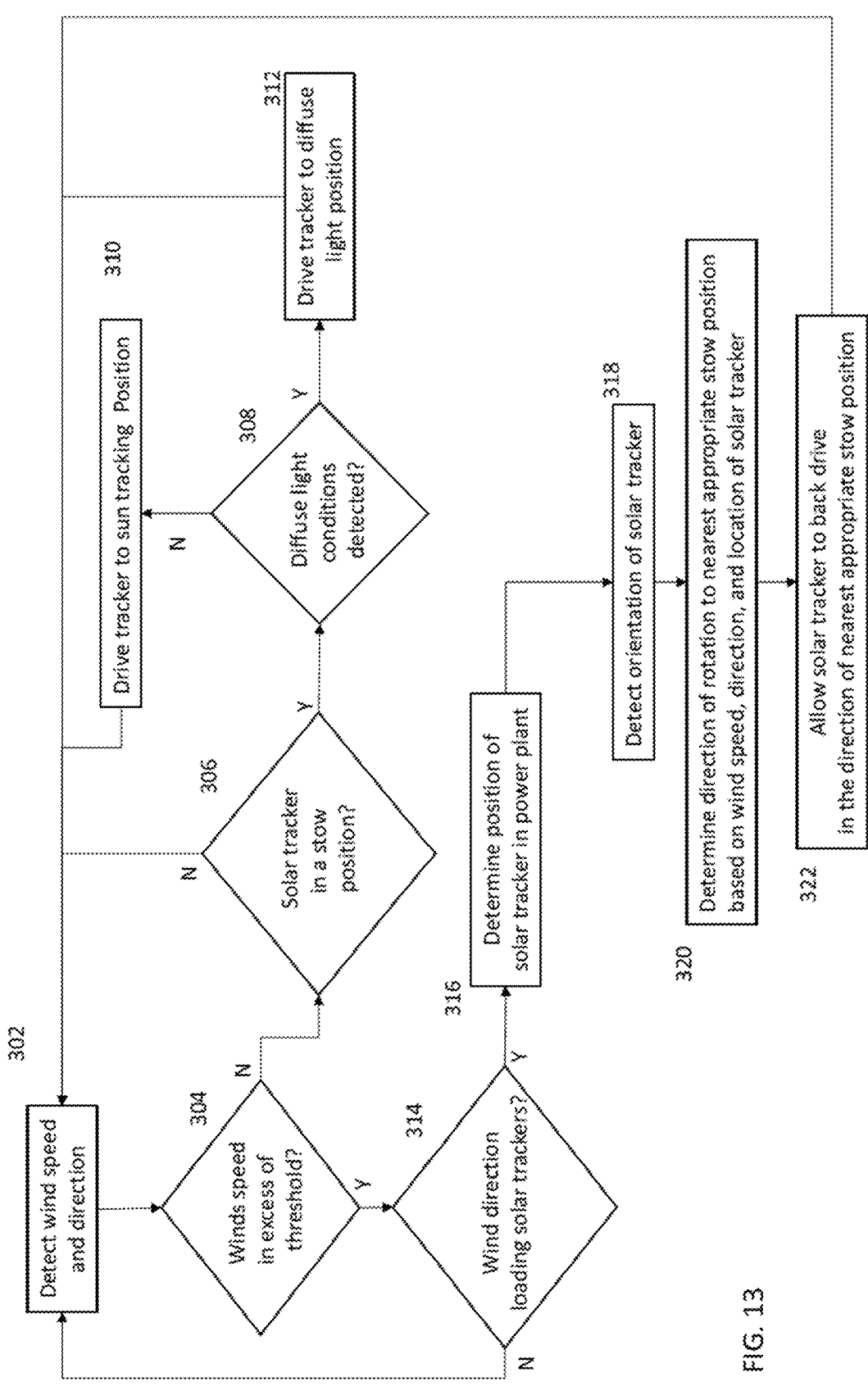
FIG. 13 is a flow diagram describing a method for a solar tracker to respond to high wind loading events.

FIG. 13 depicts an exemplary method 300 in accordance with the disclosure enabling back driving of an individual solar tracker 10 in a solar power plant based on wind speed, wind direction, and the location of the solar tracker within the solar power plant. At step 302 the wind speed and direction are detected. At step 304 the inquiry is made whether the detected wind speed exceeds a threshold. If at step 304 the answer is no, the method progresses to step 306 where an inquiry is made whether the solar tracker 10 is currently in a stop position. If the answer is no, the method returns to step 302, but if the answer is yes, the method progresses to step 308 where a determination is made as to whether diffuse light conditions exist. Here if the answer is no the method progresses to step 310, where the solar tracker 10 is driven to its sun tracking position for normal operations, but if the answer at step 308 is yes, the method moves to step 312, where the solar tracker 10 is driven to a diffuse light position. Following both steps 310 and 312, the method returns to step 302.

If at step 304 the answer to the inquiry were yes, then the method moves to step 314 where a determination is made as to whether the wind direction results in loading of the solar trackers 10. Those of skill in the art will recognize that most solar trackers have a generally north-south longitudinal axis about which they rotate. Thus, wind from the north or sound, generally does not result in loading of the solar tracker 10 and the solar modules 12 thereon. However, wind from the east or west, essentially perpendicular to the axis of rotation of the solar tracker 10 will result in the greatest magnitude of wind loading. Thus, the determination of whether to allow a back driving of a solar tracker 10 is based not just on wind speed but also the direction. As will be apparent to those of skill in the art, the more westerly or easterly the wind direction, the greater the wind loading achieved at any given wind speed. These data points for wind speed and wind direction which result in loading of the solar tracker 10 in excess of a threshold can be calculated in advance and stored in the memory of the central controller 206 or the distributed controller 200, and utilized to assess whether the threshold has been reached. If the direction of the wind is such that despite being greater than a threshold it does not sufficiently load the solar tracker (no at step 314) the method returns to step 302. If, however, the loading does exceed a threshold, the method progresses to step 316, where the inquiry is made as to where in the solar power plant the solar tracker 10 is located. As noted above, the windward most solar trackers 10 experience the greatest wind loading, accordingly, determining that a solar tracker 10 is actually a leeward most solar tracker, might indicate that despite the wind speed exceeding a threshold and the direction of the wind resulting in loading of the solar tracker, the position in the solar power plant indicates that no or only limited back driving is required. Step 316 may actually be undertaken prior to step 304 without departing from the scope of the disclosure. Further in very large solar power plants, it may be desirable for a periodic allowance of back driving of solar trackers based on the position in the solar power plant, for example, every third, fourth, fifth, sixth, tenth or other interval, to create a periodic wind fence across the solar power plant.

Following determination of the position or location of the solar tracker 10 in the solar power plant, the method progresses to step 318 where the current orientation of the solar tracker 10 is determined (e.g., determining the instantaneous angular orientation of the solar tracker). The orientation of the solar tracker is used to assess the actual impact of wind loading on the solar tracker 10. At step 320, with the wind direction and speed detected, and the location of the solar tracker within the solar power plant determined, a direction of rotation for the solar tracker is determined to arrive at the nearest stow position. As noted elsewhere herein, there may be multiple stow positions based on the wind speed and direction. Further, the solar tracker's position within the solar power plant is also a data point to consider when determining whether an individual solar tracker 10 is to be allowed to back drive to an appropriate stow position. As noted above, the stow position may be to move the solar tracker into the prevailing direction of the wind, or alternatively may allow the solar tracker to rotate with the wind. Thus, the closest appropriate stow position may require the solar tracker 10 to move either with the wind, or into the wind. At step 322, the central controller 206 or the distributed controller 200 allows the solar tracker 10 to back drive to the nearest appropriate stow position. Once the solar tracker 10 moves to the stow position, the method returns to step 302. Accordingly, the method is continuously monitoring the wind speed and direction and adjusting the positions of the solar trackers 10 of the solar power plant to prevent wind associated damage to the solar trackers 10.

Those of skill in the art will recognize that a similar method can be employed for snow loading or the solar tracker 10 either alone or in combination the wind loading method 300. The snow loading methods may assess the loading on the solar trackers 10 based on a combination of the wind loading and the effects of snow falling on the solar trackers 10. In accordance with this aspect of the disclosure, the sensors 202 may provide input related to local weather conditions such as a determination that it is currently snowing. The sensor 202 data may be combined with local weather forecasts to determine the expected duration of the snow event, and to assess whether to enable back driving to place the solar tracker 10 in a stow position for the duration of the storm, or until the sensors 202 indicate that the snow event has ceased.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of embodiments. Those skilled in the art will envision other modifications within the scope and spirit of the claims appended hereto.

What is claimed is:

1. A solar tracker comprising:
   a plurality of piers, one end of the piers configured for installation in the earth;
   a plurality of bearings, each bearing supported by a pier;
   a torque tube received in the plurality of bearings and configured to support a plurality of solar modules;
   a plurality of drive motors, each drive motor associated with a pier;

a plurality of high efficiency gear boxes, each high efficiency gear box associated with one of the plurality of drive motors, each high efficiency gear box comprising a driven gear and a drive gear, the driven gear mounted at the torque tube, the drive gear engaged between the driven gear and an output shaft of the one of the plurality of drive motors; and
   a plurality of brakes, each brake associated with one of the plurality of high efficiency gear boxes and one of the plurality of drive motors, wherein in combination the plurality of brakes apply sufficient braking force to prevent back driving of the torque tube.

2. The solar tracker of claim 1, wherein the plurality of brakes are mechanical brakes.

3. The solar tracker of claim 1, wherein the plurality of brakes is achieved by shorting windings of the motor.

4. The solar tracker of claim 3, wherein a resistance across the windings is adjusted to control a braking force.

5. The solar tracker of claim 1, further comprising a plurality of linear actuators.

6. The solar tracker of claim 5, wherein the linear actuators comprise a screw in mechanical communication with the high efficiency gear box, a nut configured to receive the screw and a sleeve, wherein the screw is driven into and out of the nut to rotate the torque tube and the solar modules.

7. The solar tracker of claim 1, further comprising a plurality of distributed motor controllers, wherein each distributed motor controller is embodied in or located proximate an individual one of the plurality of drive motors.

8. The solar tracker of claim 7, further comprising a master controller in communication with the distributed motor controllers.

9. The solar tracker of claim 8, further comprising a central power supply, wherein the master controller and the distributed motor controllers are in communication to apply or terminate application of energy to the plurality of motors and plurality of brakes in a coordinated manner.

10. The solar tracker of claim 9, further comprising a plurality of sensors, the plurality of sensors providing feedback data to the distributed motor controllers and the master controller regarding energy usage of the plurality of motors and plurality of brakes or position of the solar tracker.

11. The solar tracker of claim 1, wherein the output shaft of the one of the plurality of drive motors is rotatable at a faster rate than the drive gear and driven gear.

12. The solar tracker of claim 11, wherein the output shaft of the one of the plurality of drive motors comprises a planetary gear arrangement rotatable within a ring gear, and wherein the planetary gear arrangement at the output shaft is configured to drive the drive gear.

13. The solar tracker of claim 12, wherein the planetary gear arrangement at the output shaft is a three stage planetary gear arrangement.

14. The solar tracker of claim 12, wherein each brake associated with one of the plurality of high efficiency gear boxes and one of the plurality of drive motors is configured to engage the ring gear to apply sufficient braking force to prevent back driving of the torque tube.

15. The solar tracker of claim 11, wherein each drive motor is rated to 2.5 kNm or less.

16. The solar tracker of claim 1, wherein the driven gear at least partially circumscribes the torque tube.

17. The solar tracker of claim 16, wherein the driven gear defines an arc ranging from 135 to 195 degrees.

18. The solar tracker of claim 1, wherein each brake associated with one of the plurality of high efficiency gear boxes and one of the plurality of drive motors is biassed to an engaged position to apply sufficient braking force to prevent back driving of the torque tube.

19. The solar tracker of claim 18, further comprising:

a controller in data communication with at least the plurality of drive motors and the plurality of brakes, the controller configured to control rotation of the solar tracker; and a wind sensor providing wind data feedback to the controller, wherein, when the wind data feedback exceeds a predetermined wind threshold, the controller is configured to cause each brake, associated with one of the plurality of high efficiency gear boxes and one of the plurality of drive motors, to move from the biased, engaged position to a disengaged position that enables the torque tube to be back driven by wind.

20. A solar tracker braking system comprising:

a controller that is configured to control rotation of a torque tube of the solar tracker;

one or more sensors providing feedback to the controller;

a drive motor connected to the controller, the drive motor configured to provide motive force to cause rotation of the torque tube of the solar tracker;

a high efficiency gear box associated with the drive motor, the high efficiency gear box comprising a driven gear and a drive gear, the driven gear mounted at the torque tube, the drive gear engaged between the driven gear and an output of the drive motor; and a brake associated with the high efficiency gear box and the drive motor, wherein, when the one or more sensors provide feedback to the controller exceeding a predetermined threshold, the brake is caused to be released to enable wind induced back driving of the torque tube.

\* \* \* \* \*